(12) United States Patent
Mao et al.

(10) Patent No.: US 10,244,329 B2
(45) Date of Patent: Mar. 26, 2019

(54) RECEIVER

(71) Applicant: Goertek Inc., Shandong (CN)

(72) Inventors: Linjin Mao, Shandong (CN); Gang Chen, Shandong (CN)

(73) Assignee: GoeItek Inc., Weifang, Shandong (CN)

( * ) Notice: Subject to any disclaimer, the term of this patent is extended or adjusted under 35 U.S.C. 154(b) by 0 days.

(21) Appl. No.: 15/750,996

(22) PCT Filed: Jul. 8, 2016

(86) PCT No.: PCT/CN2016/089374
§ 371 (c)(1),
(2) Date: Feb. 7, 2018

(87) PCT Pub. No.: WO2017/045465
PCT Pub. Date: Mar. 23, 2017

(65) Prior Publication Data
US 2018/0249253 A1  Aug. 30, 2018

(30) Foreign Application Priority Data

Sep. 15, 2015  (CN) ..................... 2015 2 0712320 U

(51) Int. Cl.
*H04M 1/03*  (2006.01)
*H04R 1/02*  (2006.01)
(Continued)

(52) U.S. Cl.
CPC ................ *H04R 9/10* (2013.01); *H04M 1/03* (2013.01); *H04R 1/02* (2013.01); *H04R 9/02* (2013.01);
(Continued)

(58) Field of Classification Search
CPC .................................... H04R 9/02; H04R 9/08
(Continued)

(56) References Cited

U.S. PATENT DOCUMENTS

| 2005/0180593 | A1* | 8/2005 | Kajiwara | .................. H04R 9/06 381/412 |
| 2014/0029772 | A1* | 1/2014 | Kumagai | ................ B06B 1/045 381/162 |
| 2014/0254858 | A1* | 9/2014 | He | ......................... H04R 9/046 381/398 |

FOREIGN PATENT DOCUMENTS

| CN | 1694574 A | 11/2005 |
| CN | 201854411 U | 6/2011 |

(Continued)

OTHER PUBLICATIONS

International Searching Authority, International Search Report (ISR) and Written Opinion for International Application No. PCT/CN2016/089374, dated Sep. 1, 2016, 11 pages, State Intellectual Property Office of the P.R.C.

*Primary Examiner* — Sean H Nguyen
(74) *Attorney, Agent, or Firm* — Alston & Bird LLP

(57) ABSTRACT

A receiver is provided comprising an outside housing, and a magnetic circuit system and a vibration system accommodated in the outside housing. The vibration system comprises a vibration diaphragm and a voice coil. The outside housing comprises a first housing and a second housing matching with each other. The first housing and the second housing are provided with electrical connection structures conductive to one another thereon. The first housing is provided with a first elastic piece on a sidewall thereof. One end of the first elastic piece is welded with a spring electrically connected to an external circuit, and the other end is exposed at the outside of the sidewall of the first housing. The second housing is provided with a second elastic piece on a sidewall thereof. One end of the second elastic piece is electrically connected to a lead wire of the voice coil, and the other end of the second elastic piece is exposed at the outside of the sidewall of the second housing and is welded and (Continued)

fixed with the portion of the first elastic piece exposed at the outside. The receiver of the present utility model can reduce the lateral dimension of a product without impairing the performance of the product, and can satisfy the restrictive requirement on the lateral dimension of the product when assembled with a terminal electronic device.

10 Claims, 2 Drawing Sheets

(51) Int. Cl.
| | | |
|---|---|---|
| *H04R 1/10* | (2006.01) | |
| *H04R 9/02* | (2006.01) | |
| *H04R 9/06* | (2006.01) | |
| *H04R 9/08* | (2006.01) | |
| *H04R 9/10* | (2006.01) | |
| *H04R 11/06* | (2006.01) | |
| *H04R 25/00* | (2006.01) | |
| *H04R 31/00* | (2006.01) | |

(52) U.S. Cl.
CPC ............... *H04R 9/06* (2013.01); *H04R 9/08* (2013.01); *H04R 11/06* (2013.01); *H04R 25/604* (2013.01); *H04R 31/006* (2013.01); *H04R 1/021* (2013.01); *H04R 1/10* (2013.01); *H04R 25/65* (2013.01); *H04R 2499/11* (2013.01)

(58) Field of Classification Search
USPC ........................................................ 381/400
See application file for complete search history.

(56) References Cited

FOREIGN PATENT DOCUMENTS

| | | |
|---|---|---|
| CN | 102196339 A | 9/2011 |
| CN | 203387655 U | 1/2014 |
| CN | 203984679 U | 12/2014 |
| CN | 204046825 U | 12/2014 |
| CN | 205040019 U | 2/2016 |
| JP | 2005086760 A | 3/2005 |

* cited by examiner

RECEIVER

CROSS-REFERENCE TO RELATED APPLICATIONS

This application is a National Stage of International Application No. PCT/CN2016/089374, filed on Jul. 8, 2016, which claims priority to Chinese Patent Application No. 201520712320.X, filed on Sep. 15, 2015, both of which are hereby incorporated by reference in their entireties.

BACKGROUND

Technical Field

The present utility model relates to the field of electroacoustics, and in particular, to a receiver.

Description of Related Art

Receivers are devices capable of realizing conversion of electrical energy and acoustic energy, and are widely applied in electronic terminal devices such as mobile phones and telephones. A traditional receiver structure generally comprises a magnetic path system, a vibration system and an external housing containing the magnetic path system the vibration system. In order to realize electrical connection between the receiver and the terminal electronic device, usually a middle housing is combined with an elastic sheet in an integral injection molding manner. The elastic sheet is electrically connected to a lead of a voice coil in the receiver, while the outside of the elastic sheet needs to be connected by a spring structure. In the prior art, one end of the spring is usually welded on the elastic sheet of the middle housing, while the other end thereof is connected to the terminal electronic device, thereby realizing transmission of an external current signal into the receiver.

However, as mentioned above, since the spring is welded with the elastic sheet of the middle housing, the product needs to extend transversely based on the existing vibration system to form a space for assembling the spring, a length size of the product is increased, and the requirement of the terminal device on limitation of a transverse assembling space cannot be met. The middle housing is located in a middle layer of the receiver product, and limited by the requirements of product assembling, the spring is difficult to guide to a vertical position of the vibration system. Therefore, a new design manner for an electrical connecting structure of the receiver needs to be provided, such that the spring can be guided to the vertical position of the vibration system under the premise of not affecting the product assembling and a transverse space.

BRIEF SUMMARY

The technical problem to be solved by the present utility model is to provide a receiver, and by the improvement on the position of an electrical connecting structure thereof, the spring connected to an external circuit is guided to be above the vibration system without affecting the assembling between the product and the terminal device and a transverse space.

In order to realize the above object, the present utility model adopts the following technical solution. A receiver comprises a housing, and a magnetic path system and a vibration system that are contained in the housing; wherein the vibration system comprises a vibration diaphragm and a voice coil; the housing comprises a first housing and a second housing matched with each other; the first housing and the second housing are provided with electrical connecting structures connected with each other, the receiver is characterized in that the side wall of the first housing is provided with a first elastic sheet; one end of the first elastic sheet is welded with a spring electrically connected to an external circuit, and the other end thereof is exposed outside the side wall of the first housing; the side wall of the second housing is provided with a second elastic sheet; one end of the second elastic sheet is electrically connected to a lead of the voice coil; the other end of the second elastic sheet is exposed outside the side wall of the second housing, and is welded and fixed with the exposed part of the first elastic sheet.

As an improvement, the vibration system is contained in a cavity of the second housing; and the spring is combined on the first housing and located above the vibration system.

As an improvement, the first elastic sheet comprises a first connecting end welded and fixed with the spring and a first exposed end exposed outside the side wall of the first elastic sheet; and the second elastic sheet comprises a second connecting end electrically connected to the lead of the voice coil and a second exposed end exposed outside the side wall of the second elastic sheet.

As an improvement, the first exposed end is provided with a bonding wire and the first exposed end is connected to the second exposed end by the bonding wire.

As an improvement, the first exposed end of the first elastic sheet and the second exposed end of the second elastic sheet horizontally extend to outer sides of the side walls of the first housing and the second housing of the receiver.

As an improvement, the first exposed end is bent to a direction of the second housing and is stuck to the side wall of the first housing; and the second exposed end is bent to a direction of the first housing and overlaps with the first exposed end.

As an improvement, wherein the first exposed end and the second exposed end are fixed by laser welding and are connected.

As an improvement, the second elastic sheet is provided with a bonding pad, and the lead of the voice coil is fixed on the bonding pad by spot welding.

As an improvement, the first elastic sheet and the second elastic sheet are arranged on the side walls at the same end of the first housing and the second housing.

As an improvement, the receiver further comprises a third housing and a hearing aid voice coil; wherein the third housing is matched with the second housing and is combined under the second housing; a central position of the vibration diaphragm is combined with a reinforcing part; a metal loop supporting the vibration diaphragm is combined on the bottom side of the vibration diaphragm; and the magnetic path system comprises a basin stand and a magnet and a washer that are fixed in the basin stand.

Compared with the prior art, the receiver of the present utility model has the advantages that the first housing is additionally provided with an elastic sheet structure (the first elastic sheet), one end of the first elastic sheet is welded with the spring, and the other end thereof is exposed on the side wall of the first housing, one end of the second elastic sheet on the second housing is welded with a lead of the voice coil, and the other end thereof is exposed on the side wall of the second housing, and the exposed parts of the first elastic sheet and the second elastic sheet are connected by welding of bonding wires. Due to the design of such an electrical connecting structure, the spring is transferred to be above the vibration system from a transverse position of the product, the transverse size of the product can be reduced under the premise of not reducing a size of the vibration system (without reducing the performance of the product), and the limitation requirement on the transverse size when the product and the terminal electronic device are assembled can be met.

The reference signs comprise: 1 first housing, 2 second housing, 3 first elastic sheet, 31 first connecting end, 32 first exposed end, 320 bonding wire, 4 second elastic sheet, 40 bonding pad, 41 second connecting end, 42 second exposed end, 5 spring, 6 voice coil, 61 voice coil lead, 7 vibration diaphragm, 8 third housing, 9 reinforcing part, 10 metal loop, 11 basin stand, 12 magnet, 13 washer, 14 hearing aid voice coil.

DETAILED DESCRIPTION OF VARIOUS EMBODIMENTS

The present utility model is further explained in combination with the drawings and embodiments.

Embodiment I

Figure 1:
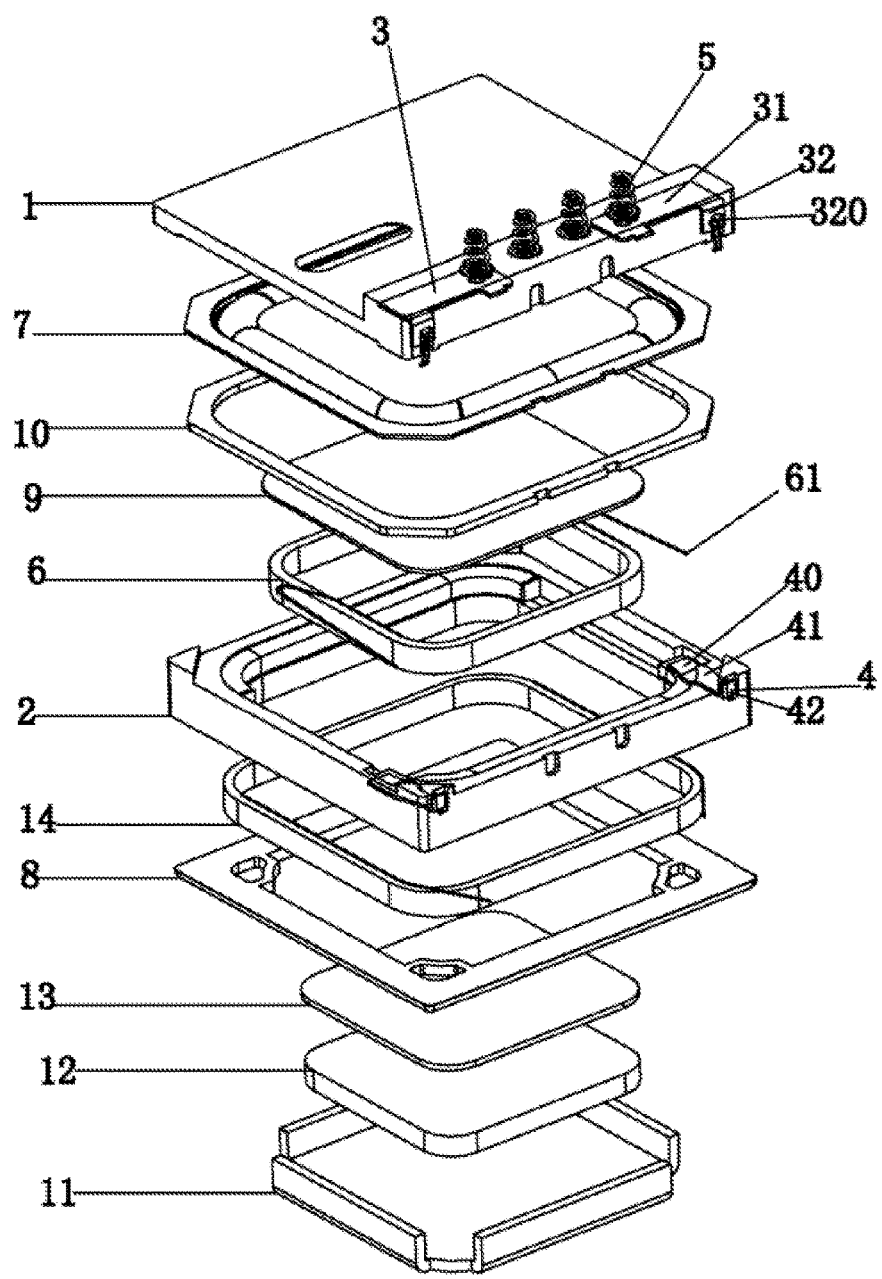
FIG. 1 is an exploded view of a structure of a receiver of the present utility model.
Figure 2:
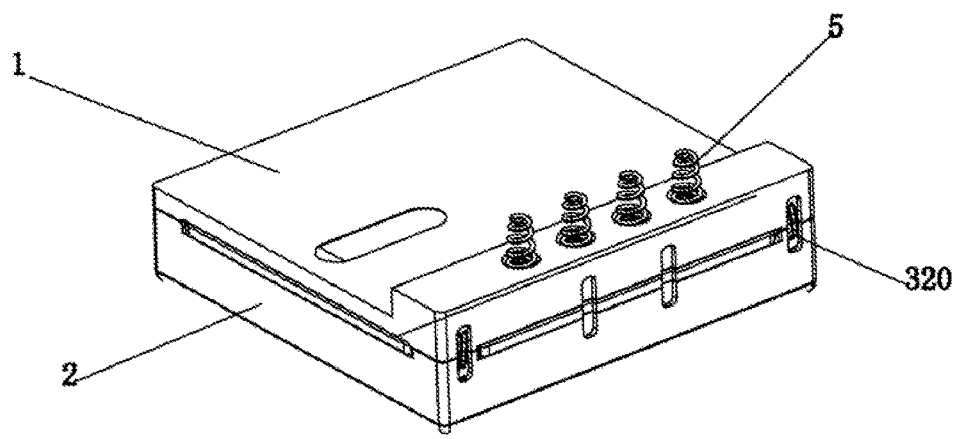
FIG. 2 is a space diagram of a structure of a receiver according to an embodiment I of the present utility model.

Referring to FIG. 1, the receiver of the present utility model comprises a peripheral housing. Specifically, the peripheral housing comprises a first housing 1, a second housing 2 and a third housing 8 which are matched with one another from top to bottom, and the three housings form a cavity containing a magnetic path system and a vibration system. Further, the magnetic path system comprises a basin stand 11, a magnet 12 adhered to and fixed on the basin stand and a washer 13 covering the magnet 12. The vibration system comprises a vibration diaphragm 7 and a voice coil 6 adhered to the vibration diaphragm 7, and the vibration diaphragm 7 can be fixed with the second housing 2 by a metal loop 10 capable of supporting the vibration diaphragm 7. In addition, in order to enhance the performance of the product at a high frequency, a central position of the vibration diaphragm 7 is also combined with a reinforcing part 9 which is generally a rigid composite layer structure.

As mentioned above, in the magnetic path system, a certain distance exists between the side wall of the basin stand 11 and the magnet 12 and forms a magnetic gap. The lower end of the voice coil 6 is disposed in the magnetic gap. The voice coil 6 also comprises a voice coil lead 61 electrically connected to an electrical connecting structure of the receiver.

Referring to FIG. 1, according to the receiver of the present utility model, the first housing 1 and the second housing 2 are provided with electrical connecting structures connected with each other. The side wall of the first housing 1 is provided with a first elastic sheet 3. During implementation, the first elastic sheet 3 and the first housing 1 are formed by integral injection molding. One end of the first elastic sheet 3 is welded with a spring 5 electrically connected to an external circuit, while the other end thereof is exposed outside the side wall of the first housing 1. Similarly, the side wall of the second housing 2 is provided with a second elastic sheet 4 by integral injection molding, and the second elastic sheet 4 is provided with a bonding pad 40. One end of the second elastic sheet 4 is welded and fixed with the voice coil lead 61 by the bonding pad 40 (generally by spot welding), while the other end thereof is exposed outside the side wall of the second housing 2. Specifically, the first elastic sheet 3 comprises a first connecting end 31 and a first exposed end 32, wherein the first connecting end 31 is welded with the spring 5 and the part exposed outside the side wall of the first housing 1 is the first exposed end 32. Similarly, the second elastic sheet 4 specifically comprises a second connecting end 41 and a second exposed end 42, wherein the second connecting end 41 is fixed with the voice coil lead 61 by spot welding and the part exposed outside the side wall of the second housing 2 is the second exposed end 42.

As mentioned above, according to the receiver of the present utility model, the electrical connecting structure comprises the first elastic sheet 3, the second elastic sheet 4 and the spring 5 communicated with the external circuit. In order to connect an internal circuit to the external circuit, it is necessary to electrically connect the first elastic sheet 3 to the second elastic sheet 4. While in the present embodiment, the first elastic sheet 3 and the second elastic sheet 4 are connected by a wire bonding process, that is, the first exposed end 32 of the first elastic sheet 3 is provided with a bonding wire 320, the second exposed end 42 of the second elastic sheets 4 is welded and connected to the first exposed end 32 of the first elastic sheet 3 by the bonding wire 320, such that the electrical connection between the first elastic sheet 3 and the second elastic sheet 4 is realized, and the connection between the internal circuit and the external circuit is realized. In this way, a current signal of the external circuit can be transmitted to the first elastic sheet 3 and the second elastic sheet 4 in sequence by the spring 5, and finally reaches the voice coil 6 fixed with the second elastic sheet 4 by spot welding. After the voice coil 6 receives the current signal, under the action of an electromagnetic field, the voice coil 6 performs motion of cutting magnetic lines of force in a reciprocating manner, and the vibration diaphragm 7 is further driven to vibrate to radiate sound waves to the outside, thereby finishing conversion from electrical energy to acoustic energy.

Embodiment II

The present embodiment is basically same as the embodiment I, and differs from the embodiment I in the following.

Figure 3:
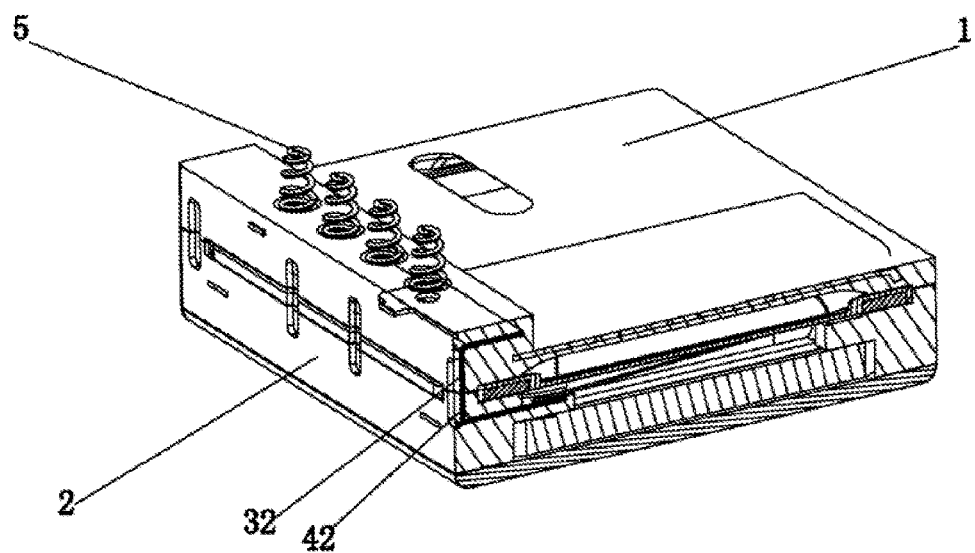
FIG. 3 is a space diagram of a structure of a receiver according to an embodiment II of the present utility model.

Referring to FIG. 3, in the present embodiment, the connecting manner between the first elastic sheet 3 and the second elastic sheet 4 is different from that of the embodiment I. Specifically, the first exposed end 32 of the first elastic sheet 3 and the second exposed end 42 of the second elastic sheet 4 horizontally extend to the outer sides of the side walls of the first housing 1 and the second housing 2 respectively. Further, the first exposed end 32 is bent to a direction of the second housing 4, and is stuck to the side wall of the first housing 3. Correspondingly, the second exposed end 42 is bent to a direction of the first housing 3 and may overlap with the first exposed end 32. The first exposed end 32 and the second exposed end 42 are fixed by laser welding and are connected.

In the present technical solution, since the vibration diaphragm 7 is fixed on the second housing 2, that is, the vibration system is contained in the cavity of the second housing 2, while the spring 5 is combined on the first housing 1, that is to say, in the present technical solution, the spring 5 moves to be above the vibration system, i.e., a vertical position, from an existing transverse position. The phenomenon in the prior art that the limitation requirement on a transverse size cannot be met due to the arrangement of a transverse space of the spring can be avoided. Meanwhile, such structural design does not reduce the size of the vibration system, and thus cannot affect the overall acoustic performance of the product.

Preferably, in order to facilitate assembling, the first elastic sheet 3 and the second elastic sheet 4 are disposed on the side walls at the same end of the first housing 1 and the second housing 2.

Preferably, the receiver of the present utility model further comprises a hearing aid voice coil 14.

It needs to be noted that the above embodiments merely show the receiver of a single magnetic path structure. In fact, the implementation of the present technical solution is not limited to the product of such a magnetic path structure, may also be suitable for the receiver of other magnetic path structures comprising two side magnets or four side magnets, and is not limited thereto.

The above is merely implementing solutions of the present utility model, and is not used for limiting the present utility model, and equivalent modifications or changes made by those ordinary skilled in the art according to the content disclosed in the present utility model should belong to a protective scope recorded in the claims.

What is claimed is:

1. A receiver comprising:
   a housing;
   a magnetic path system contained in the housing; and
   a vibration system contained in the housing;
   wherein:
      the vibration system comprises a vibration diaphragm and a voice coil,
      the housing comprises a first housing and a second housing matched with each other,
      the first housing and the second housing are provided with electrical connecting structures connected with each other,
      a side wall of the first housing is provided with a first elastic sheet, one end of the first elastic sheet being welded with a spring electrically connected to an external circuit, and the other end of the first elastic sheet being exposed outside the side wall of the first housing,
      a side wall of the second housing is provided with a second elastic sheet, one end of the second elastic sheet being electrically connected to a lead of the voice coil, and the other end of the second elastic sheet being exposed outside the side wall of the second housing and being welded and fixed with the exposed part of the first elastic sheet.

2. The receiver according to claim 1, wherein:
   the vibration system is contained in a cavity of the second housing, and
   the spring is combined on the first housing and located above the vibration system.

3. The receiver according to claim 1, wherein:
   the first elastic sheet comprises a first connecting end welded and fixed with the spring and a first exposed end exposed outside the side wall of the first elastic sheet, and
   the second elastic sheet comprises a second connecting end electrically connected to the lead of the voice coil and a second exposed end exposed outside the side wall of the second elastic sheet.

4. The receiver according to claim 3, wherein:
   the first exposed end is provided with a bonding wire, and
   the first exposed end is connected to the second exposed end by the bonding wire.

5. The receiver according to claim 3, wherein the first exposed end and the second exposed end horizontally extend to outer sides of the side walls of the first housing and the second housing of the receiver respectively.

6. The receiver according to claim 5, wherein:
   the first exposed end is bent to a direction of the second housing and is sticked to the side wall of the first housing, and
   the second exposed end is bent to a direction of the first housing and overlaps with the first exposed end.

7. The receiver according to claim 6, wherein the first exposed end and the second exposed end are fixed by laser welding and are connected.

8. The receiver according to claim 1, wherein:
   the second elastic sheet is provided with a bonding pad, and
   the lead of the voice coil is fixed on the bonding pad by spot welding.

9. The receiver according to claim 1, wherein the first elastic sheet and the second elastic sheet are arranged on the side walls at the same end of the first housing and the second housing.

10. The receiver according to claim 1, wherein:
    the receiver further comprises a third housing and a hearing-aid voice coil,
    the third housing is matched with the second housing and is combined under the second housing, a central position of the vibration diaphragm is combined with a reinforcing part,
    a metal loop supporting the vibration diaphragm is combined on the bottom side of the vibration diaphragm, and
    the magnetic path system comprises a basin stand and a magnet and a washer that are fixed in the basin stand.

* * * * *

UNITED STATES PATENT AND TRADEMARK OFFICE
CERTIFICATE OF CORRECTION

PATENT NO. : 10,244,329 B2
APPLICATION NO. : 15/750996
DATED : March 26, 2019
INVENTOR(S) : Mao et al.

It is certified that error appears in the above-identified patent and that said Letters Patent is hereby corrected as shown below:

On the Title Page

(73) Assignee: Delete "Goeltek Inc." and insert --Goertek Inc.--

Signed and Sealed this
Seventh Day of May, 2019

Andrei Iancu
*Director of the United States Patent and Trademark Office*